Feb. 11, 1964  K. B. MOUNT ET AL  3,120,912
PITCHERS AND THE LIKE COVERED DISPENSING CONTAINERS
Filed March 28, 1960  2 Sheets-Sheet 2
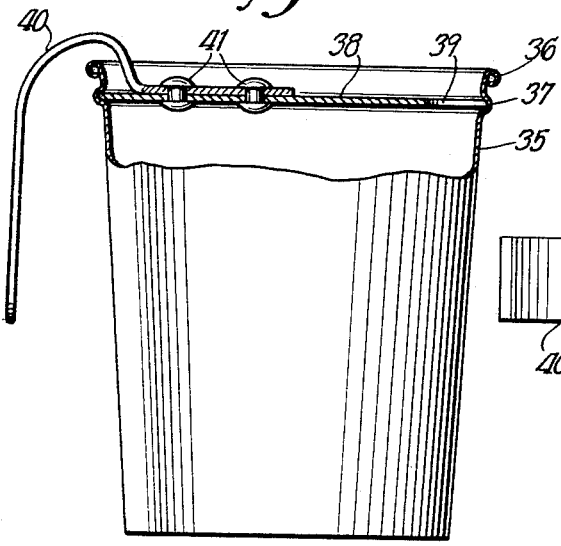
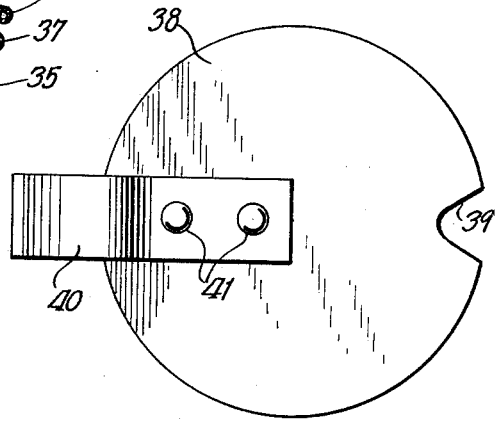
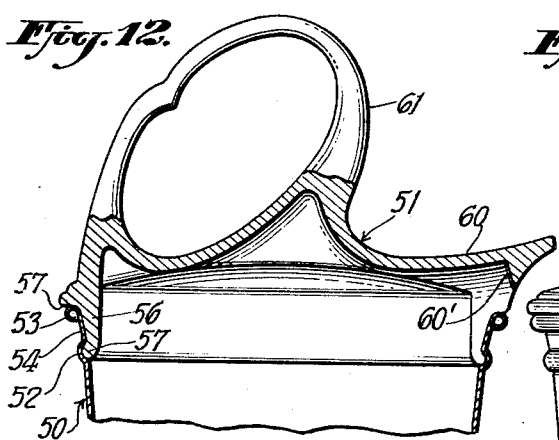
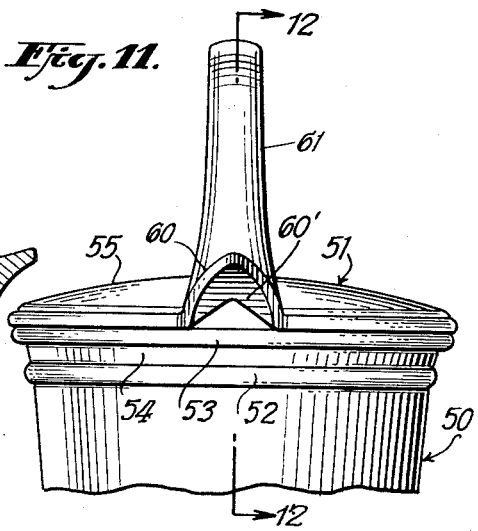
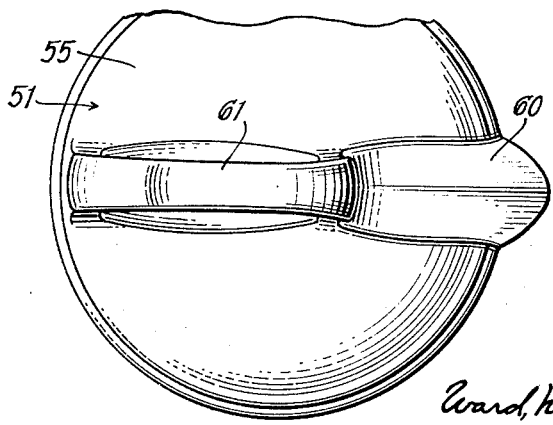
INVENTORS.
KEITH B. MOUNT.
BY CLARK D. SIMS.
Ward, Neal, Haselton Orme & McElhannon
ATTORNEYS.

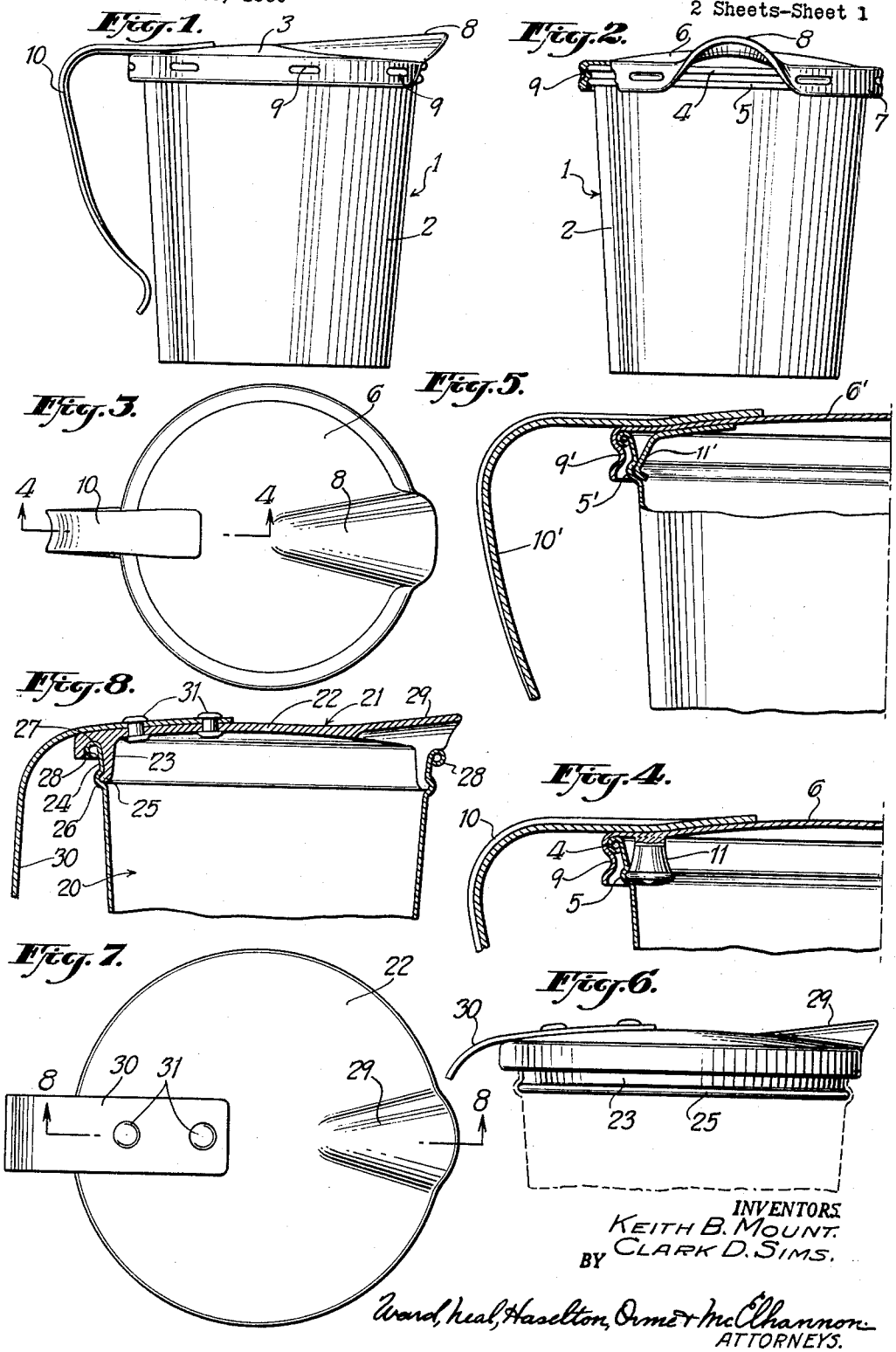

United States Patent Office 3,120,912
Patented Feb. 11, 1964

3,120,912
PITCHERS AND THE LIKE COVERED
DISPENSING CONTAINERS
Keith B. Mount, New Providence, N.J., and Clark D. Sims, Elmhurst, Ill., assignors to Lily-Tulip Cup Corporation, New York, N.Y., a corporation of Delaware
Filed Mar. 28, 1960, Ser. No. 17,825
8 Claims. (Cl. 222—567)

This invention relates to pitchers and more especially to covered hygienic pitchers which may be readily filled and serviced. The invention is intended primarily for bedside use in hospitals and sick-rooms, but in its broader aspects the invention is useful for other purposes.

Heretofore there has been a great need for a bedside pitcher which is strictly hygienic and which would induce cleanliness. No better illustration of this need could be given than to quote from an article appearing in Time Magazine January 12, 1959:

"Death at the Bedside

"The hospital patient who complains that the water in his bedside carafe is not fit to drink is usually right, reports the New England Journal of Medicine. In fact, the stuff could kill him. It was patients' complaints that set a team of Harvard University physicians and Peter Bent Brigham Hospital bacteriologists to checking bedside water in 24 of Boston's non-Government hospitals. What they found was far worse than they had feared.

"Two-thirds of the carafes examined were 'grossly unhygienic,' meaning that in many there were the partly decomposed bodies of insects or islands of algae and fungi. Often the walls were slimy. Most had a stale odor and a few were literally foul. When the bacteriologists went to work they found that in 22% of the carafes the water contained colon bacilli and no fewer than 69% held *Staphylococcus aureus*, including at least one of the deadly penicillin resistant strains that have caused wholesale epidemics and killed babies in some hospital nurseries. (Time, March 24 et seq.).

"The microbes do not come from Boston city water, the researchers established that contains enough chlorine to kill them off. And ice made from the water under proved conditions is equally safe. The trouble originates right in the hospitals. Most of them have carafes with narrow necks so they cannot be properly cleaned without a brush—and not a single bottle brush was found. Most carafes are made of materials that will not stand sterilization by heat, and no hospital specified disinfection as part of the cleaning routine. In one-third of the hospitals the carafes were cleaned in the utility room—along with basins, bedpans and urinals. In many cases ice was prepared without adequate safeguards then juggled into the carafes by employees' unwashed fingers. In one hospital a nurse emptied (but made no effort to clean) the carafe of a patient who had just died, and left it at the bedside for the next patient . . . ."

The chief object of this invention is to provide a pitcher which will obviate the difficulties above noted relative to hospital pitchers presently in use.

Another object is to provide a pitcher or the like container adapted to be manufactured economically and which will facilitate the practice of hygienic conditions.

A further object is to provide a detachable lid or closure adapted to be used in combination with an open mouth disposable body to provide a pouring or dispensing head therefor and which may be readily cleaned or sterilized for repeated use.

Further objects and advantages of the invention will more fully appear from the following description taken in connection with the drawings which illustrate by way of example presently preferred embodiments of the invention.

Referring more particularly to the drawings:

FIG. 1 is a side elevational view of a pitcher embodying our invention;

FIG. 2 is a front elevational view of the pitcher shown in FIG. 1;

FIG. 3 is a plan view of the pitcher shown in FIGS. 1 and 2;

FIG. 4 is a somewhat enlarged cross sectional view taken at line 4—4 of FIG. 3, showing further details;

FIG. 5 is a view similar to FIG. 4 showing a modification;

FIG. 6 is a side elevational view of a pitcher illustrating a further embodiment of our invention;

FIG. 7 is a plan view of the pitcher shown in FIG. 6;

FIG. 8 is a cross sectional view taken at line 8—8 of FIG. 7;

FIG. 9 is a side elevational view, partly in section, showing a further embodiment of our invention;

FIG. 10 is a plan view of the pitcher shown in FIG. 9;

FIG. 11 is a front elevational view of a pitcher, with a part of the body broken away, showing a further embodiment of the invention;

FIG. 12 is a longitudinal sectional view taken at line 12—12 of FIG. 11 showing the pitcher in sectional elevation; and FIG. 13 is a plan view of the pitcher shown in FIG. 11.

In general, the invention contemplates a closure lid which is adapted to be readily cleaned or sterilized for re-use and is provided with means for securing it to the open end of a disposable body having cooperating engageable means; the lid having a recess providing for the passage of liquid therethrough and over the lip of the open end of the body and the lid preferably also having a handle integral therewith and serving as the handle of the pitcher. Preferably, the disposable body is a paper container of a conventional type readily available on the market and which may be discarded economically after a limited use, or the container may be made of plastic or other suitable material.

Referring to the drawings, and more particularly to FIGS. 1, 2, 3 and 4.

The pitcher is designated in its entirety as 1 and comprises a body member 2 and a closure lid 3. In accordance with this embodiment of the invention, the body 2 is shown as an open mouth container of a conventional type of frusto-conical shape having an open upper end defined by a resilient or flexible lip which has a peripheral bead 4 (FIG. 4) at its upper edge and the lip extends downwardly and is defined at its lower portion by an internal peripheral recess 5. This type of container is relatively inexpensive and therefore may be discarded after temporary use, thereby obviating the necessity of cleaning or sterilizing the body of the pitcher.

The lid 3 is in the nature of a permanent lid intended for repeated use and in this embodiment is made from stainless steel or other suitable stiff material which may be subjected to sterilization by heat as by treating in an autoclave at approximately 350° F. In order to facilitate cleaning or sterilization, the lid is kept as free as possible from all cracks, crevices and enclosed portions, and with this in view, the lid body is shown as being made of one piece of sheet material formed to provide a top 6 and a depending peripheral flange 7 which is continuous except at the zone where the top 6 and flange 7 are offset upwardly to provide a pouring hood 8 which is spaced away from the lip of the body member 2 so that the liquid being poured will pass directly over the bead 4 of the lip beneath the hood 8. This accomplishes two purposes. First, the portion of the spout constituted by the lip will be completely replaced when the container body is disposed of after a limited use, and secondly, the hood portion 8, being entirely open, may be more readily cleaned and sterilized than if the spout enclosure in its entirety is provided on the lid. In order to securely fasten the lid 3 on the container body 2, the peripheral flange 7 is provided with a plurality of circumferentially spaced depressions, such as 9, providing inwardly extending projections adapted to snugly engage beneath the lip bead 4 of the container (FIGS. 2 and 4) and serving to exert pressure on the lower side of the bead 4 to seal the same against the inside of the lid 3. To insure a positive seal on the bead 4 the margin of the top 6 is made flat (FIGS. 3, 4 and 6) over the bead 4. The lid 3 is provided with a rigid handle 10 integrally secured to the top 6, preferably being spot welded for strength and dip brazed with ribbon silver solder to avoid cracks and crevices. Preferably, the solder comprises 45% silver, 30% copper and 25% zinc and is free of cadmium.

In the embodiment shown, the pitcher has a capacity of about a quart and is adapted for holding ice water. While the projections 9 on the lid normally insure holding the lid and container body together, it may be desirable in some instances to provide means for more positively interlocking the members together, and such means is provided by a lid lock 11 (FIG. 4) which is shown in the form of a button depending from the inner surface of the wall 6 and rigidly secured thereto, as by welding and soldering, the lower end of the button being formed with a peripheral bead which engages within the internal recess 5. The lid lock button 11 is positioned beneath the handle 10 so as to lie diametrically opposite the pouring hood 8 and is positioned opposite one of the inner projections 9 so that the lip of the container is firmly locked between the projections 9 and the button 11. In FIG. 5 a modified form of lid lock is shown comprising a finger 11' provided with a sharp bend at its lower end for engaging within the lip recess 5' and having its upper end rigidly secured to the top 6' of the lid. The lid lock 11' being otherwise disposed and functioning in the manner as described with respect to the lid lock 11.

In applying the lid with either the lock 11 or 11', the lid is tipped so that a small segment of the lip 4—5 is first inserted between the lid flange 7 and lock such as 11, and the lid is progressively snapped in place commencing with the segment adjacent the lock 11.

In FIGS. 6, 7 and 8, an embodiment of the invention is shown wherein the pitcher is adapted primarily for table service, e.g., for holding single servings of hot drinks, such as tea, coffee, chocolate or coffee cream, etc. In this particular embodiment the container body 20 may be of a convenient size such, for example, as a half-pint, although of course the invention is not to be limited to any particular size. In this embodiment the lid 21 may be made of a suitable plastic which can withstand washing at temperatures and with detergents encountered in conventional commercial dish washing machines. As illustrative of such plastics, the following are noted: Polypropylene, "Cycolac," which is a brand name of an "ABS" (acrylonitrile - butadiene - styrene copolymer) type rigid thermoplastic resin suitable for injection molding, extruding, etc., and "Kralastic," which is a brand name of an "ABS" type molding compound. In this embodiment the lid 21 comprises a top portion 22 provided with a downwardly extending peripheral flange portion 23 adapted to snugly fit within the lip wall 24 of the container 20 and provided at its lower edge with a bead 25 for interfitting engagement within an internal recess 26 of the container lip. The lid engages with the recess 26 and with the beaded edge 28 to provide liquid tight seals. The top portion of the lid extends outwardly beyond the flange 23 and is provided with a recess 27 for snug interfitting engagement with the beaded edge 28 of the container body. This arrangement not only secures the cover to the container body, but serves to effectively seal the parts together to prevent the escape of the hot liquid.

The top of the cover is provided with a pouring hood 29 (FIGS. 7 and 8) comparable to the hood 8 of FIGS. 1–3. The hood 29 defines the upper part of a recess which extends downwardly through the flange 23 so that the liquid being poured from the body will pass directly over the beaded edge 28 in the manner above pointed out with respect to FIGS. 1–3. A rigid handle such as 30 is secured to the top 22 of the lid 21, by means of rivets such as 31. In order to facilitate manufacture, the flange 23 may be made as a separate piece securely fastened in a groove provided in the top 22 so as to be integrally united therewith.

In FIGS. 9 and 10, a simplified embodiment of the invention is shown which is also believed to be of special usefulness for the serving of individual portions of hot drinks. In this embodiment the receptacle body is of a similar conventional type and is designated as 35 and is provided with a lip having the usual beaded upper edge 36 and an internal annular recess such as 37. The lid is in the form of a flat disc 38 whose peripheral portion fits tightly within the recess 37 so as to form therewith a liquid tight seal and a portion of the disc 38 is cut out, as at 39, so as to provide a portion offset from the lip of the receptacle and to form jointly therewith a pouring spout. The handle 40 is rigidly secured to the upper surface of the disc 38, such as by rivets 41, or spot welding, in the position opposite the recessed opening 39. The handle 40 is offset upwardly and outwardly adjacent its point of attachment so as to be spaced away from the beaded edge 36 of the container lip and provide clearance so as not to interfere with the liquid seal engagement between the periphery of the disc and the lip of the container. The lid is preferably made of stainless steel and we have obtained satisfactory results with the lid in which the disc 38 is about 1/16" in thickness and the handle 40 is the same thickness.

In FIGS. 11–13 a further embodiment is shown which is a variation of the pitcher illustrated in FIGS. 6–8 and intended for like uses. This pitcher comprises a disposable body designated in general as 50, which is shown in the present embodiment as a paper cup or the like container, and a reusable lid or cover 51, which is made of a plastic such as described relative to the lid 21 of FIGS. 6–8. The body 50 has an open upper end defined by a flexible or yieldable lip comprising an internal annular recess 52 spaced downwardly from a beaded upper edge 53 to provide an intervening neck portion 54. The lid 51 comprises a top portion 55 and an integrally formed peripheral flange 56 adapted to fit snugly within the neck portion 54 of the container 50 and provided at its lower edge with an external bead 57 adapted for interfitting engagement within the container recess 52. The top portion of the lid extends outwardly beyond the flange 56 to provide a shoulder 57 disposed over the bead 53 and adapted for engagement therewith. The lid thus has an interfitting engagement with the container lip providing a liquid tight seal, except for the pouring opening to be described below.

The top of the lid is provided with a pouring hood 60 comparable to the hood 29 of FIGS. 7 and 8, and defines the upper part of a recess which extends downwardly through the flange 56 so that the pour opening is jointly provided by the lid and lip of the body 50, and the liquid being poured from the body 50 will pass directly over the lip bead 53 of the disposable body 50. The hood 60 is preferably provided with a baffle shoulder 60' serving to reduce the pouring stream to the desired cross section without a corresponding reduction in the size of the hood 60. In this embodiment the handle 61 is molded as an integral part of the lid and extends upwardly from the top portion 55. The front of the handle is disposed adjacent the rear of the hood 60 where it joins the top 55 and the rear of the handle terminates within the diameter defining the lid flange 56. The disposition of the handle on top of the pitcher, instead of over the side of the body 50, is highly beneficial, since it not only facilitates molding the lid but places the center of gravity in proximity to the vertical centerline and thus greatly improves the stability of the pitcher. This latter feature is of especial importance in small pitchers and especially when the pitcher is empty or partially empty, at which times a handle offset as in the embodiment shown in FIGS. 6–8 would tend to upset the pitcher.

It will be appreciated from the foregoing that the invention is useful not only where the matter of strict sanitation is a matter of life and death, as in hospitals where deadly viruses are prevalent; but also where the matter of sanitation is required to inhibit the spread of diseases by providing sanitary covered receptacles for general table service, as in restaurants. The invention is also useful in providing disposable bodies which may be discarded so that a fresh clean body may be used instead of replenishing the supply or refilling a reusable body with materials such as syrup, honey, sugar, cream, etc.

Having thus described our invention with particularity with reference to presently preferred embodiments thereof it will be obvious to those skilled in the art, after understanding our invention, that various changes and modifications may be made therein without departing from the spirit and scope of our invention, and we aim in the appended claims to cover such changes and modifications as fall within the scope of the invention.

What we claim is:

1. In a pitcher of the class described, the combination comprising: a disposable receptacle constituting the body of the pitcher and having an open end defined by a lip, a reusable lid, connecting means on said receptacle and said lid cooperating to secure said lid releasably to the lip of said receptacle, said lid having a portion offset in a direction away from the lip of said receptacle and cooperating therewith to form a pouring spout therebetween, said lid having a pouring handle integral therewith and locking means depending from said lid and engaging the inner wall of said receptacle adjacent said handle to prevent displacement of said receptacle relatively to said lid under the influence of the weight of the contents during the pouring position of the pitcher.

2. In a pitcher of the class described, the combination comprising: a disposable receptacle having an open end defined by a lip provided with an internal annular depression and spaced downwardly from the upper edge of said lip, a reusable lid, means on said lid for engaging within said depression to secure said lid releasably to said receptacle, said lid having a portion offset in a direction away from the nearest region of said receptacle to form conjointly therewith a pouring spout therebetween, whereby the contents of the receptacle passes over the lip thereof when poured.

3. A pitcher as set forth in claim 2 in which the upper edge of the receptacle lip is provided with a bead and the engaging means on said lid comprises a downwardly extending flange for engagement within said lip from the beaded upper edge to the annular depression, said flange having a bead on its lower edge for engagement within said depression and a recess exterior said flange snugly engaging said container lip bead.

4. In a pitcher of the class described, the combination comprising: a disposable receptacle constituting the body of the pitcher and having an open end defined by a lip, a closure lid consisting of material adapted to withstand repeated use and cleansing and comprising a handle portion integral therewith and a peripheral portion in the form of a downwardly extending flange having means for releasable interengagement with the lip of said container, and said lid being provided with a pouring recess extending through said downwardly extending flange for the passage of liquid therethrough in direct contact with said container lip.

5. A closure lid for use on a disposable container of the type having an open mouth defined by a lip portion provided with an internal groove spaced downwardly from an upper beaded edge, said lid consisting of material adapted to withstand repeated use and cleansing and comprising a handle portion integral therewith and a peripheral portion provided with a downwardly extending flange having an outwardly disposed bead engageable within the internal groove of the lip of said container, said lid further provided with a marginal flange extending outwardly beyond said flange for overlying the upper beaded edge of said lip, and said lid being provided with a pouring recess extending through said peripheral portion for the passage of liquid therethrough in direct contact with said container lip.

6. A container for holding material to be dispensed therefrom comprising a disposable receptacle body having an open mouth portion defined by a flexible lip portion provided with an internal groove spaced downwardly from an upper beaded edge, a reusable lid, said lid consisting of material adapted to withstand repeated use and cleansing, said lid comprising a handle portion and a peripheral rigid portion adapted for interfitting detachable engagement with said internal groove of said flexible lip portion of said body, and said lid having a pouring opening provided therein.

7. A closure lid for use on a disposable container of the type having an open mouth defined by a lip portion provided with a beaded upper edge serving as an interlocking engagement for said lid and an internal annular recess spaced downwardly from the beaded upper edge, said lid consisting of material adapted to withstand repeated use and cleansing and comprising a handle portion integral therewith and a peripheral portion including a downwardly extending flange engageable exteriorly of said bead and provided with spaced inwardly extending projections for interfitting engagement beneath the beaded container edge, a locking member adjacent said handle and positioned for engagement within the internal recess opposite one of the inwardly extending projections, and a pouring recess extending through said peripheral portion for the passage of liquid therethrough in direct contact with the container lip.

8. A closure lid for use on a disposable container of the type having an open mouth defined by a lip portion provided with a beaded upper edge serving as an interlocking engagement for said lid and an internal groove spaced downwardly from the upper beaded edge, said lid consisting of material adapted to withstand repeated use and cleansing and comprising a handle portion integral therewith and a peripheral portion including a downwardly extending flange having an outwardly disposed bead engageable within the internal groove of the container, said lid having a marginal edge extending outwardly beyond said flange and provided on its underside with a recess for receiving the upper beaded edge of the lip, and a pouring recess extending through said peripheral portion for the passage of liquid therethrough in direct contact with the container lip.

References Cited in the file of this patent

UNITED STATES PATENTS

| | | |
|---|---|---|
| 1,027,421 | Jungclas | May 28, 1912 |
| 1,126,564 | Purinton | Jan. 26, 1915 |
| 1,282,103 | Moffat | Oct. 22, 1918 |
| 1,823,861 | Michelin | Sept. 15, 1931 |
| 2,193,366 | Hardwick | Mar. 12, 1940 |
| 2,625,306 | Murphy | Jan. 13, 1953 |
| 2,673,661 | Barton | Mar. 30, 1954 |
| 2,767,754 | Lederer et al. | Oct. 23, 1956 |
| 2,878,848 | Coltman | Mar. 24, 1959 |
| 2,886,218 | Marcus | May 12, 1959 |